J. H. YOUNG.
ACCELERATOR CONTROLLING MECHANISM.
APPLICATION FILED OCT. 21, 1916.
1,214,866.
Patented Feb. 6, 1917.
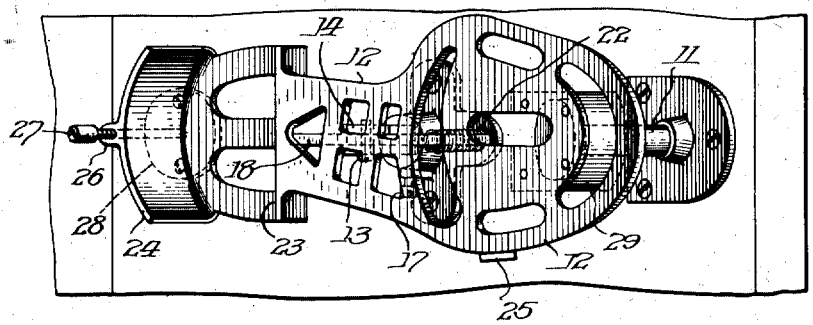
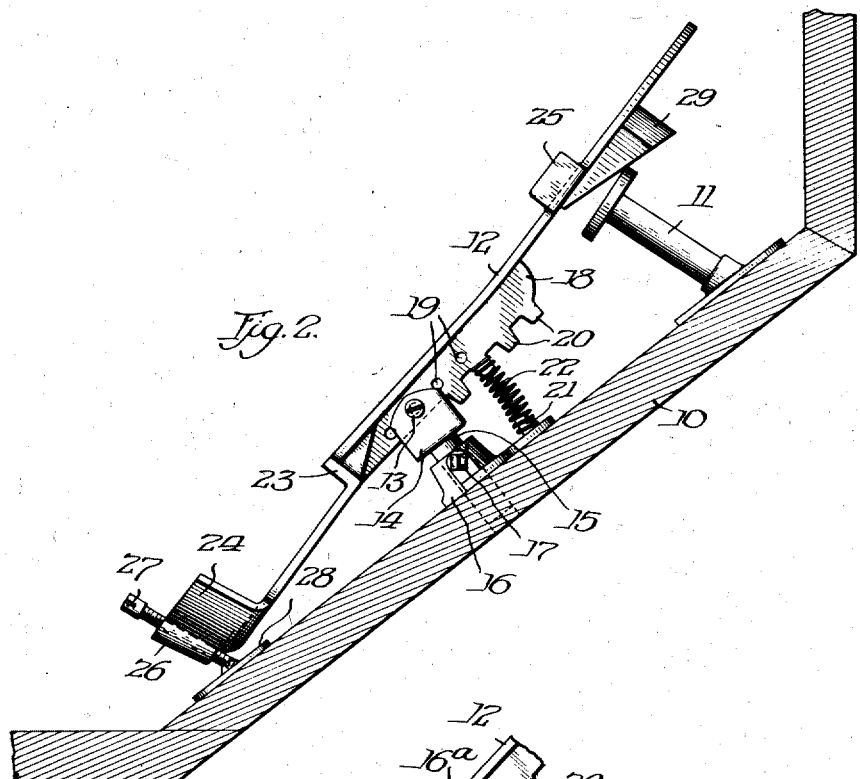
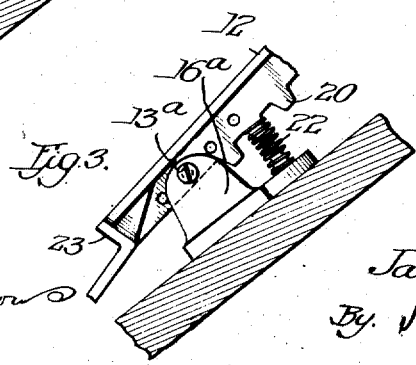
Witnesses:
Inventor
Jacob H. Young.
By Albert C. Bell
Atty.

UNITED STATES PATENT OFFICE.

JACOB H. YOUNG, OF CHICAGO, ILLINOIS.

ACCELERATOR-CONTROLLING MECHANISM.

1,214,866. Specification of Letters Patent. Patented Feb. 6, 1917.

Application filed October 21, 1916. Serial No. 126,855.

*To all whom it may concern:*

Be it known that I, JACOB H. YOUNG, a citizen of the United States, residing at Chicago, in the county of Cook and State of Illinois, have invented a certain new and useful Improvement in Accelerator-Controlling Mechanisms of which the following is a specification.

My invention relates to an improved mechanism for use in connection with the accelerator of a motor vehicle to permit the foot of the operator to rest in a natural position and move naturally and without undue fatigue in manipulating the accelerator mechanism. I am aware that various devices have been proposed in the past for supporting a part of the foot of the operator and other devices have also been proposed for operation by a lateral rocking movement of the foot. In connection with these devices, however, either the foot is not properly supported or the operating motion is unnatural and fatigue quickly follows the use of the device. By my invention I provide a support for the whole of the foot of the operator which support is so mounted that the foot may have a natural rocking movement longitudinally of the foot with the result that the fatigue produced by operating the mechanism is reduced to a minimum. By my invention I also provide devices by which the support for the foot may be given different positions relatively to the floor of the car to accommodate operators of different size and the mounting devices are also constructed, so that the foot support may be given different positions longitudinally upon said mounting devices to facilitate fitting the device to any particular operator. By my invention I also provide means for holding the accelerator controlling mechanism in engagement with the accelerator and further devices for producing a multiplied action of the accelerator for a given amount of motion of the foot support.

The several drawings illustrating my invention are as follows:

Figure 1 shows the device in plan view,

Fig. 2 shows the device in side elevation, and

Fig. 3 shows a modified form of mounting bracket.

Similar numerals refer to similar parts throughout the several views.

As shown in Figs. 1 and 2, the inclined portion of the floor of an automobile is seen at 10 and through this inclined floor portion an accelerator 11 projects in a manner common in automobile construction. A foot support 12 is mounted with its forward or toe end over the accelerator 11 upon a transverse pivot 13 carried by a yoke 14 secured to the upper end of a rod 15 which in turn is supported in the mounting block 16 by means of a set screw 17. As a result of the construction described the foot support 12 may be rocked on an axis extending transversely of the foot substantially parallel with the bottom thereof and the entire foot support and its supporting pivot rod 13 may be moved toward or away from the floor 10 of the car, as desired, by releasing the set screw 17, the tightening of which again secures the yoke 14 and the parts carried thereby in the desired position. This permits adjusting the foot support 12 to different positions to accommodate operators of different size.

The underside of the foot support 12 is provided with a longitudinal flange 18 through which a plurality of holes 19 are formed to receive the pivot rod 13, which pivot rod is preferably in the form of a screw or bolt, so that it may readily be removed from the yoke 14 to permit mounting the foot support with the pivot rod extending through any desired one of the holes 19, to afford a further adjustment of the foot support to accommodate different operators. The lower edge of the flange 18 is provided with teeth 20, one of which is substantially over the stud 21 carried by the base of the mounting block 16 to hold in place the ends of the spring 22 employed to keep the foot support in position, permitting the accelerator 11 to occupy its outermost position when no pressure is applied by the operator to the foot support to operate the accelerator mechanism. In this manner no extra load is placed upon the returning mechanism of the accelerator proper which is, therefore, free to perform its intended function in precisely the same manner as though it were operated directly by the foot of the operator.

The foot support 12 is constructed, as clearly indicated in Figs. 1 and 2, to support the entire foot of the operator, and to hold the foot in position upon said foot support the latter is provided with an offset portion at 23 for engaging the forward edge of the heel of the operator's shoe, and a rear upwardly projecting curved wall 24 for engaging and supporting the rear surface of the heel of the operator's shoe. At one edge of the toe portion of the foot support an upwardly extending lug or flange member 25 is provided to prevent the toe of the shoe from slipping from the foot support. The outwardly extending wall 24 is provided near its central portion with a rearwardly extending boss 26 through which a stop screw 27 extends, so that its lower end engages a striking plate 28 carried by the floor 10. For any desired adjustment of the foot portion 12 upon the mounting block 16, the screw 27 is turned until it brings the forward or toe portion of the foot support into engagement with the accelerator 11 against the action of the spring 22 which results in eliminating lost motion and rattling of the parts.

The under portion of the forward end of the foot support 12 carries a metal wedge 29, the thin edge of which is innermost and the inclined surface of the wedge resting against the outer end of the accelerator 11. As a result of this construction, when the toe portion of the foot support is depressed, the wedge 29 moves in two directions, first downwardly in a direction to depress the accelerator 11, and, second, in a motion transversely of the accelerator, bringing a thicker part of the wedge over the engaged portion of the end of the accelerator. This results from the operating radius of the foot support, extending from its pivot to its point of engagement with the accelerator, being at an obtuse angle to the axis of the accelerator 11, which is the desirable relation, in order to secure the multiplying action referred to. As a result of this construction the amount of motion of the foot support required to secure a desired degree of acceleration is less than would be required were the wedge 29, or some similar device, not employed.

In some cases it is not necessary to provide an adjustment for the pivot rod of the foot support and for these cases a mounting block 16ᵃ may be employed which, as shown in Fig. 3, directly supports the pivot rod 13ᵃ, the mechanism in other respects, however, being the same as above described in connection with Figs. 1 and 2.

The parts of the device may be made either of cast or stamped metal and given any particular conformation desired. The teeth 20 are provided so that one of said teeth will be in line with the stud 21 to support the ends of the spring 22 regardless of which hole 19 may be occupied by the pivot rod 13.

While I have shown my invention in the particular embodiments above described, I do not, however, limit myself to the precise constructions disclosed but I may, on the other hand, employ any equivalents thereof known to the art at the time of the filing of the appended claims.

What I claim is:

1. In an accelerator controlling mechanism, a support for the entire foot of the operator, a pivot rod extending transversely of said support and substantially parallel with the plane of said support, a yoke supporting said pivot rod, a supporting rod projecting from said yoke, a mounting block for supporting said supporting rod, a flange projecting from the under surface of said foot support and having teeth thereon, a stud projecting outwardly from said mounting block, and a spring supported between said stud and one of said teeth for holding the toe portion of said foot support in its outermost position, said flange having a plurality of holes therethrough for receiving said pivot rod in different positions longitudinally of said foot support.

2. In an accelerator controlling mechanism, a support for the entire foot of the operator, a pivot rod extending transversely of said support and substantially parallel with the plane of said support, a yoke supporting said pivot rod, a supporting rod projecting from said yoke, a mounting block for supporting said supporting rod, a flange projecting from the under surface of said foot support and having teeth thereon, a stud projecting outwardly from said mounting block, a spring supported between said stud and one of said teeth for holding the toe portion of said foot support in its outermost position, said flange having a plurality of holes therethrough for receiving said pivot rod in different positions longitudinally of said foot support, and a screw stop carried by the heel portion of said foot support for limiting the outward motion of the toe portion of said foot support.

3. In an accelerator controlling mechanism, a support for the entire foot of the operator, a pivot rod extending transversely of said support and substantially parallel with the plane of said support, a yoke supporting said pivot rod, a supporting rod projecting from said yoke, a mounting block for supporting said supporting rod, a flange projecting from the under surface of said foot support and having teeth thereon, a stud projecting outwardly from said mounting block, a spring supported between said stud and one of said teeth for holding the toe portion of said foot support in its outermost position, said flange having a plurality of holes therethrough for receiving said pivot rod in different positions longitudinally of said foot support, a screw stop carried by the heel portion of said foot support for limiting the outward motion of the toe portion of said foot support, and a multiplying device carried by said foot support for engaging the accelerator of the automobile to depress said accelerator an amount greater than the amount of depression of the corresponding portion of the foot support.

4. In an accelerator controlling mechanism, the combination of a support for the entire foot of an automobile operator, a pivot rod for said support extending transversely thereof and substantially parallel with the surface thereof, a mounting block supporting said pivot rod, a longitudinal flange extending from the under surface of said support and having a plurality of teeth projecting from its edge, said flange having a plurality of holes therethrough for receiving said pivot rod in different positions of said foot support relatively to said mounting block, and a returning spring engaging one of said teeth for holding said foot support with its toe portion in its outermost position.

5. In an accelerator controlling mechanism, the combination of a support for the entire foot of an automobile operator, a pivot rod for said support extending transversely thereof and substantially parallel with the surface thereof, a mounting block supporting said pivot rod, a longitudinal flange extending from the under surface of said support and having a plurality of teeth projecting from its edge, said flange having a plurality of holes therethrough for receiving said pivot rod in different positions of said foot support relatively to said mounting block, a returning spring engaging one of said teeth for holding said foot support with its toe portion in its outermost position, and a motion limiting screw carried by the heel portion of said foot support.

6. In an accelerator controlling mechanism, the combination of a support for the entire foot of an automobile operator, a pivot rod for said support extending transversely thereof and substantially parallel with the surface thereof, a mounting block supporting said pivot rod, a longitudinal flange extending from the under surface of said support and having a plurality of teeth projecting from its edge, said flange having a plurality of holes therethrough for receiving said pivot rod in different positions of said foot support relatively to said mounting block, a returning spring engaging one of said teeth for holding said foot support with its toe portion in its outermost position, and a multiplying mechanism carried by the toe portion of the foot support for operating the accelerator of the automobile.

7. In an accelerator controlling mechanism, the combination of a support for the entire foot of an automobile operator, a pivot rod for said support extending transversely thereof and substantially parallel with the supporting surface thereof, a mounting block supporting said pivot rod, a spring for holding the toe portion of said foot support in its outermost position, and a screw stop carried by the heel portion of said foot support for holding said foot support in engagement with the accelerator of the automobile.

8. In an accelerator controlling mechanism, the combination of a support for the entire foot of an automobile operator, a pivot rod for said support extending transversely thereof and substantially parallel with the surface thereof, a mounting block supporting said pivot rod, and a multiplying mechanism carried by the under surface of the toe portion of said foot support for engaging the accelerator of the automobile.

9. In an accelerator controlling mechanism, the combination of a support for the entire foot of an automobile operator, a pivot rod for said support extending transversely thereof and substantially parallel with the surface thereof, a mounting block supporting said pivot rod, and a wedge carried by the under surface of the toe portion of said foot support for engaging the accelerator of the automobile, said wedge being disposed relatively to the effective radius of operation of said foot support and the axis of said accelerator to bring a thicker portion of said wedge over said accelerator when the toe portion of the foot support is depressed.

10. In an accelerator controlling mechanism, the combination of a support for the entire foot of an automobile operator, a pivot rod for said support extending transversely thereof and substantially parallel with the supporting surface thereof, a mounting block supporting said pivot rod, and a screw stop carried by the heel portion of said foot support for holding said foot support in engagement with the accelerator of the automobile.

11. In an accelerator controlling mechanism, the combination of a support for the entire foot of an automobile operator, a pivot rod for said support extending transversely thereof and substantially parallel with the supporting surface thereof, a mounting block supporting said pivot rod, a spring for holding the toe portion of said foot support in its outermost position, a screw stop carried by the heel portion of said foot support for holding said foot support in engagement with the accelerator of the automobile, and a multiplying mechanism carried by the under surface of the toe portion of said foot support for engaging the accelerator of the automobile.

12. In an accelerator controlling mechanism, the combination of a support for the entire foot of an automobile operator, a pivot rod for said support extending transversely thereof and substantially parallel with the supporting surface thereof, a mounting block supporting said pivot rod, a spring for holding the toe portion of said foot support in its outermost position, a screw stop carried by the heel portion of said foot support for holding said foot support in engagement with the accelerator of the automobile, and a wedge carried by the under surface of the toe portion of said foot support for engaging the accelerator of the automobile, said wedge being disposed relatively to the effective radius of operation of said foot support and the axis of said accelerator to bring a thicker portion of said wedge over said accelerator when the toe portion of the foot support is depressed.

13. In an accelerator controlling mechanism, a support for the entire foot of the operator, a pivot rod extending transversely of said support and substantially parallel with the plane of said support, a yoke supporting said pivot rod, a supporting rod projecting from said yoke, a mounting block for supporting said supporting rod, a set screw for holding said supporting rod in any desired position in said mounting block whereby the distance of said foot support from said mounting block may be changed, and a screw stop for holding the foot support adjacent the end of the accelerator.

14. In an accelerator controlling mechanism, a support for the entire foot of the operator, a pivot rod extending transversely of said support and substantially parallel with the plane of said support, a yoke supporting said pivot rod, a supporting rod projecting from said yoke, a mounting block for supporting said supporting rod, a set screw for holding said supporting rod in any desired position in said mounting block whereby the distance of said foot support from said mounting block may be changed, and a multiplying device carried by the foot support for operating the accelerator.

In witness whereof, I hereunto subscribe my name this 18th day of October, A. D. 1916.

JACOB H. YOUNG.